(12) United States Patent
Bubeck

(10) Patent No.: US 12,351,155 B2
(45) Date of Patent: Jul. 8, 2025

(54) METHOD FOR FAULT DETECTION IN A VEHICLE DYNAMICS CONTROL

(71) Applicant: Robert Bosch GmbH, Stuttgart (DE)

(72) Inventor: Samuel Bubeck, Yokohama (JP)

(73) Assignee: ROBERT BOSCH GMBH, Stuttgart (DE)

( * ) Notice: Subject to any disclaimer, the term of this patent is extended or adjusted under 35 U.S.C. 154(b) by 21 days.

(21) Appl. No.: 18/558,131

(22) PCT Filed: Mar. 31, 2022

(86) PCT No.: PCT/EP2022/058538
§ 371 (c)(1),
(2) Date: Oct. 30, 2023

(87) PCT Pub. No.: WO2023/280451
PCT Pub. Date: Jan. 12, 2023

(65) Prior Publication Data
US 2024/0367629 A1   Nov. 7, 2024

(30) Foreign Application Priority Data
Jul. 5, 2021   (DE) .................. 10 2021 207 039.6

(51) Int. Cl.
*B60T 8/88*     (2006.01)
*B60T 8/1755*   (2006.01)
*B60T 11/10*    (2006.01)

(52) U.S. Cl.
CPC ............ *B60T 8/885* (2013.01); *B60T 8/1755* (2013.01); *B60T 11/10* (2013.01); *B60T 2270/403* (2013.01)

(58) Field of Classification Search
CPC ........ B60T 8/885; B60T 8/1755; B60T 11/10; B60T 2270/403; B60T 8/4077; B60T 2270/406; B60Y 2306/15; B60Y 2400/81
See application file for complete search history.

(56) References Cited

U.S. PATENT DOCUMENTS

2020/0361439 A1   11/2020  Neu et al.
2021/0291800 A1*   9/2021  Jesse ................. B60T 17/225
2024/0025384 A1*   1/2024  Weh .................... B60T 17/04

FOREIGN PATENT DOCUMENTS

DE   102017113563 A1   12/2018
DE   102019209396 A1   12/2020
(Continued)

OTHER PUBLICATIONS

International Search Report for PCT/EP2022/058538, Issued Jul. 22, 2022.

*Primary Examiner* — Xiao En Mo
(74) *Attorney, Agent, or Firm* — NORTON ROSE FULBRIGHT US LLP

(57) ABSTRACT

A method for fault detection in a vehicle dynamics control, in a system which includes a power brake and a vehicle dynamics control and is configured to couple the power brake hydraulically to the vehicle dynamics control. The method includes: generating a first control signal and providing the first control signal to the vehicle dynamics control to provide a first hydraulic pressure using the vehicle dynamics control; generating the first hydraulic pressure by means of the vehicle dynamics control, wherein a second hydraulic pressure at the hydraulic coupling is controlled using the power brake in such a way that a hydraulic volume in the system remains constant; wherein, after the process of generating the first hydraulic pressure has ended, a third hydraulic pressure of the vehicle dynamics control is determined at the hydraulic coupling to detect a fault in the vehicle dynamics control.

13 Claims, 6 Drawing Sheets

(56) References Cited

FOREIGN PATENT DOCUMENTS

| | | | |
|---|---|---|---|
| JP | 2015071382 | A | 4/2015 |
| JP | 2017001491 | A | 1/2017 |
| JP | 2019189206 | A | 10/2019 |

\* cited by examiner

METHOD FOR FAULT DETECTION IN A VEHICLE DYNAMICS CONTROL

BACKGROUND INFORMATION

In addition to stabilizing functions, for example in the form of a classic ESP/ABS function, current vehicle brake systems increasingly comprise advanced functions such as driver support or force application to the brake pedal during brake actuation by means of an electromechanical brake booster (EBB) or also assisting or partially assisting functions by means of a unit for actively modulating the hydraulic brake pressure (e.g., ESP, EBB, boost unit, etc.), without active participation of the driver.

Driver assistance systems are becoming more and more widespread in today's motor vehicles in various forms. They intervene in a partially automated or fully automated manner in the drive, the control systems, such as the steering, or the signaling devices of the vehicle, or alert the driver shortly before or during critical situations by means of suitable human-machine interfaces. A brake system typically comprises an electronic brake booster (EBB) and an ESP system. In this configuration, the majority of brake systems can implement functions using an ESP system and the brake booster is used as an external actuator to build dynamic pressure. Alternatively, in OneBox brake systems, a brake booster and ESP functions can be combined in one device to control corresponding hydraulic system.

SUMMARY

In accordance with applicable laws governing the registration and operation of vehicles, every brake system for such a vehicle has to be able to ensure a minimum deceleration of 2.44 m/s$^2$ at 500 Newton pedal force for a single point of failure. This goal and other stricter guidelines from potential customers can affect the hydraulic configuration of the brake system significantly.

Thus, in particular the master cylinder of such a brake system is configured in such a way that a correspondingly appropriate hydraulic pressure can be set at the respective input force without additional boosting of the pressure at the wheel brakes. Due to the different volume uptake, however, such a configuration also makes it impossible for all vehicle types or all possible brake calipers to be operated with one brake system configuration without significantly extending the length of the master cylinder and/or the pedal travel.

According to aspects of the present invention, a method for fault detection in a vehicle dynamics control, in a system which consists of a power brake and a vehicle dynamics control, a system for fault detection in a vehicle dynamics control and a use of the system are provided. Advantageous configurations of the present invention are disclosed herein.

Throughout this description of the present invention, the sequence of method steps is presented in such a way that the method is easy to follow. However, those skilled in the art will recognize that many of the method steps can also be carried out in a different order and lead to the same or a corresponding result. In this respect, the order of the method steps can be changed accordingly. Some features are numbered to improve readability or to make the assignment more clear, but this does not imply a presence of specific features.

According to one aspect of the present invention, a method is provided for fault detection in a vehicle dynamics control, in a system which consists of a power brake and a vehicle dynamics control, wherein the system is configured to hydraulically couple the power brake to the vehicle dynamics control. According to an example embodiment of the present invention, the method includes the following steps:

In one step, a first control signal is generated and the first control signal is provided to the vehicle dynamics control in order to provide a first hydraulic pressure by means of the vehicle dynamics control. In a further step, the first hydraulic pressure is generated by means of the vehicle dynamics control, wherein a second hydraulic pressure at the hydraulic coupling is controlled by means of the power brake in such a way that a hydraulic volume in the system remains constant, and wherein, after the process of generating the first hydraulic pressure has ended, a third hydraulic pressure of the vehicle dynamics control is determined at the hydraulic coupling in order to detect a fault in the vehicle dynamics control.

According to an example embodiment of the present invention, such a system can include a decoupled power brake (DPB) as the braking force brake, for instance, with which the driver brakes into a simulator during normal operation and the actual brake pressure is generated by means of a plunger. This inlet pressure can be passed on to a vehicle dynamics control via two brake lines. In such a brake system, brake pressure can be built up with a plunger of the power brake or a pump of the vehicle dynamics control independent of the actuation of a brake pedal. The power brake primarily takes over the necessary dynamic building of brake pressure and can be configured to carry out longitudinally dynamic brake assist functions. The vehicle dynamics control can provide stabilization functions and any needed emergency functions, such as building hydraulic brake pressure, in the event of a fault.

The vehicle dynamics control of the system can thus build a required brake pressure in an emergency based on a request from the driver. Alternatively or additionally, a brake system based on this system can be configured to build the necessary brake pressure by means of vehicle dynamics control if the power brake fails or there is hydraulic leakage in the system that causes a legally required minimum deceleration to no longer be possible. For such a safety-critical configuration of such an emergency function, the vehicle dynamics control has to have a very high availability.

According to an example embodiment of the present invention, high availability can be ensured with the described method for fault detection to detect a latent fault in the vehicle dynamics control, because such a fault could prevent the correct activation of an emergency function in the event of failure of the power brake, such as a decoupled brake booster and/or hydraulic leakage in the vehicle dynamics control.

According to an example embodiment of the present invention, the method for fault detection can, for instance, be carried out when starting the engine with the electronic parking brake still closed. However, the test can also be carried out at other times while the vehicle is stationary. The method for fault detection can also be carried out while driving, in particular if a wheel brake pressure generated in the process is appropriate for a current driving situation and a current braking request and/or if the wheel brake pressure generated in the method is compatible with a specific driving situation.

According to an example embodiment of the present invention, the method for fault detection can be controlled by means of the power brake, i.e. in particular by a control unit of the power brake. To provide the first control signal, interfaces can be used that also signal-couple other functions between the power brake and the vehicle dynamics control.

A level of the first hydraulic pressure built by means of the first vehicle dynamics control in response to the first control signal can be configurable and can be requested by the power brake in the method for fault detection. The level of the first hydraulic pressure can correspond to a brake pressure that corresponds to the emergency function required by law.

In response to the request by the first control signal, the vehicle dynamics control can build the requested pressure with a pump by using hydraulic volume provided by the power brake. In other words, hydraulic volume can be drawn out of the power brake by the vehicle dynamics control.

Since the system consisting of the power brake and the vehicle dynamics control is closed, for example as a brake system, an interface can be provided that enables the vehicle dynamics control to communicate a suctioning of hydraulic volumes, such as brake fluid, to the power brake. The power brake can be configured to prevent unwanted additional hydraulic volume from entering the system, such as the brake circuits of the system.

For this purpose, the power brake can comprise a plunger and regulate it, in a so-called suction support system, in such a way that no negative pressure is created in the system, or in particular in the power brake. Because, if the negative pressure is sufficiently high, hydraulic volume can be drawn out of a reservoir tank in the power brake through safety valves, for example BSV valves. This ability to draw hydraulic volume, such as brake fluid, out of the reservoir tank can be provided for special situations and should possibly be avoided during normal operation in order to ensure proper functioning of the system.

According to an example embodiment of the present invention, if the first hydraulic pressure has been successfully built up in the vehicle dynamics control, the desired hydraulic pressure is applied to the brake cylinders of the respective wheels, for example, or in a respective high-pressure hydraulic circuit of the vehicle dynamics control. The second hydraulic pressure at the hydraulic coupling of the power brake is controlled or regulated, for example by means of a plunger, in such a way that a hydraulic volume in the system remains constant. In other words, the hydraulic volume needed to build pressure in the driving dynamics is provided by a hydraulic volume from the plunger, the piston of which is moved accordingly. In other words, the hydraulic volume needed to build pressure in the vehicle dynamics control is provided by the power brake, in particular by a hydraulic volume of the plunger, for example by moving the piston of the plunger to a forward position.

According to an example embodiment of the present invention, the second hydraulic pressure that prevails in a region between the plunger of the power brake and the coupling valve of the vehicle dynamics control can be regulated at a low level, for example by means of a pressure sensor of the power brake, which is disposed in this region to determine the hydraulic pressure.

According to an example embodiment of the present invention, the power brake and/or the vehicle dynamics control can be configured to be coupled to one another in that a coupling valve of the power brake and a coupling valve of the vehicle dynamics control are configured to be hydraulically coupled to one another. In other words, the hydraulic coupling of the system to the power brake and the vehicle dynamics control can be configured between the coupling valve of the vehicle dynamics control and the coupling valve of the power brake in order to hydraulically couple the power brake and the vehicle dynamics control to one another.

According to an example embodiment of the present invention, the generation of the first hydraulic pressure can be ended after a predetermined time, for example by the power brake sending a corresponding end signal to the vehicle dynamics control. In a further step, the coupling valve of the vehicle dynamics control between the power brake and the vehicle dynamics control can be opened to achieve hydraulic pressure equalization up to the plunger of the power brake. The plunger of the power brake is controlled in such a way that a previous position of the piston of the plunger is maintained to achieve a pressure increase up to the plunger in a thus coupled hydraulic line. The third hydraulic pressure can be determined using the plunger pressure sensor to detect the fault in the vehicle dynamics control. In other words, when the third hydraulic pressure reaches and/or exceeds a specific expected level, a sufficiently high second hydraulic pressure has been built up in the vehicle dynamics control, which demonstrates that the vehicle dynamics control is sufficiently functional.

According to an example embodiment of the present invention, the method for fault detection can advantageously carry out an active function test, for example when starting the vehicle, in order to, at that point in time, exclude the presence of a latent fault in the hydraulic system of the vehicle dynamics control and the associated electronic components. The function test can include the method for fault detection in order to determine a latent fault in the hydraulic system of the vehicle dynamics control.

Using the method for fault detection advantageously makes it possible to achieve a significantly higher degree of freedom in the hydraulic configuration of the brake system, as a result of which greater flexibility of the overall brake system-to-vehicle selection options for an OEM and a supplier can be achieved. Thus, a brake system can be configured in such a way that it can be used flexibly for many vehicle classes.

A design guideline for the brake system can therefore be expanded by using the method for fault detection according to the present invention, in that the likelihood of a failure of the brake force support for a driver driving a thus equipped vehicle is sufficiently minimized. This is because an availability of an emergency function, for example a brake force support, to be provided by the vehicle dynamics control in the event of a fault can be ensured by the method for fault detection.

With a power brake that is decoupled from a driver, the method for fault detection can advantageously be interrupted at any time without special measures.

According to an example embodiment of the present invention, to provide the first control signal to the vehicle dynamics control, an existing interface for signals between the power brake and the vehicle dynamics control can advantageously be used. The method for fault detection can be controlled by the power brake and therefore does not have to be spread over two systems, which makes it easier to interchange the vehicle dynamics control with products from other manufacturers.

According to one aspect of the present invention, it is provided that the first control signal is generated by means of the power brake, in particular a control unit of the power brake.

According to one aspect of the present invention, it is provided that the power brake is a decoupled power brake (DPB) and/or the vehicle dynamics control is an electronic stability control (ESP) system.

According to one aspect of the present invention, it is provided that the hydraulic volume of the system is kept constant by means of a plunger of the power brake.

According to one aspect of the present invention, it is provided that the plunger not comprise a snifting bore. Advantageously, a plunger that does not have a snifting bore can be used with the method for fault detection, which enables the installation space for the system to be kept small.

According to one aspect of the present invention, it is provided that the hydraulic volume of the system is kept constant by mechanically moving a position of a piston of the plunger of the power brake out of an initial position.

According to one aspect of the present invention, it is provided that the generation of the first hydraulic pressure is ended after an elapsed time interval.

According to one aspect of the present invention, it is provided that a valve is opened after the elapsed time interval to hydraulically couple the power brake and the vehicle dynamics control to one another by means of the valve.

According to one aspect of the present invention, it is provided that the valve is an, in particular controllable, valve of the vehicle dynamics control.

The valve can in particular be a coupling valve of the vehicle dynamics control.

According to one aspect of the present invention, it is provided that the first hydraulic pressure and/or the second hydraulic pressure and/or the third hydraulic pressure is determined by means of a pressure sensor of the power brake at the hydraulic coupling.

The pressure sensor of the power brake can in particular be a plunger pressure sensor.

According to one aspect of the present invention, it is provided that the first control signal is provided by a control unit of the power brake. The control unit of the power brake can in particular be a control unit for the power brake and/or a control unit that forms a dedicated unit with the power brake for controlling the power brake.

According to one aspect of the present invention, it is provided that the first control signal is a binary signal and/or an analog signal.

According to one aspect of the present invention, it is provided that the method is carried out prior to a start of a mobile platform.

According to one aspect of the present invention, it is provided that, in the method for fault detection, a parking brake of the mobile platform is closed prior to the first step of the method.

The present invention provides a system for fault detection in a vehicle dynamics control, in a system which consists of a power brake and a vehicle dynamics control, wherein the system comprises a power brake and a vehicle dynamics control and the system is configured to hydraulically couple the power brake to the vehicle dynamics control. The system also comprises a control unit for the power brake, wherein the power brake is signal-coupled to the vehicle dynamics control and the system is configured to carry out any one of the above-described methods.

Such a system advantageously enables the method to be easily integrated into different mobile platforms.

A use of the above-described system for braking at least one wheel of a mobile platform is provided according to the present invention.

The term "mobile platform" can be understood to be an at least partially automated system that is mobile and/or a driver assistance system of a vehicle. One example can be an at least partially automated vehicle or a vehicle comprising a driver assistance system. In other words, in this context, an at least partially automated system comprises a mobile platform in terms of at least partially automated functionality, but a mobile platform also includes vehicles and other mobile machines including driver assistance systems. Other examples of mobile platforms can be driver assistance systems comprising a plurality of sensors, mobile multi-sensor robots, such as robot vacuum cleaners or lawnmowers, a multi-sensor monitoring system, a manufacturing machine, a personal assistant or an access control system. Each of these systems can be a fully or partially automated system.

A mobile platform, and in particular an at least partially automated vehicle, comprising an above-described system is proposed. Such a mobile platform can advantageously realize all of the advantages of the method for fault detection according to the present invention in a vehicle dynamics control.

BRIEF DESCRIPTION OF THE DRAWINGS

An embodiment example of the present invention is shown with reference to FIGS. 1 to 6 and explained in more detail in the following.

DETAILED DESCRIPTION OF EXAMPLE EMBODIMENTS

Figure 1:
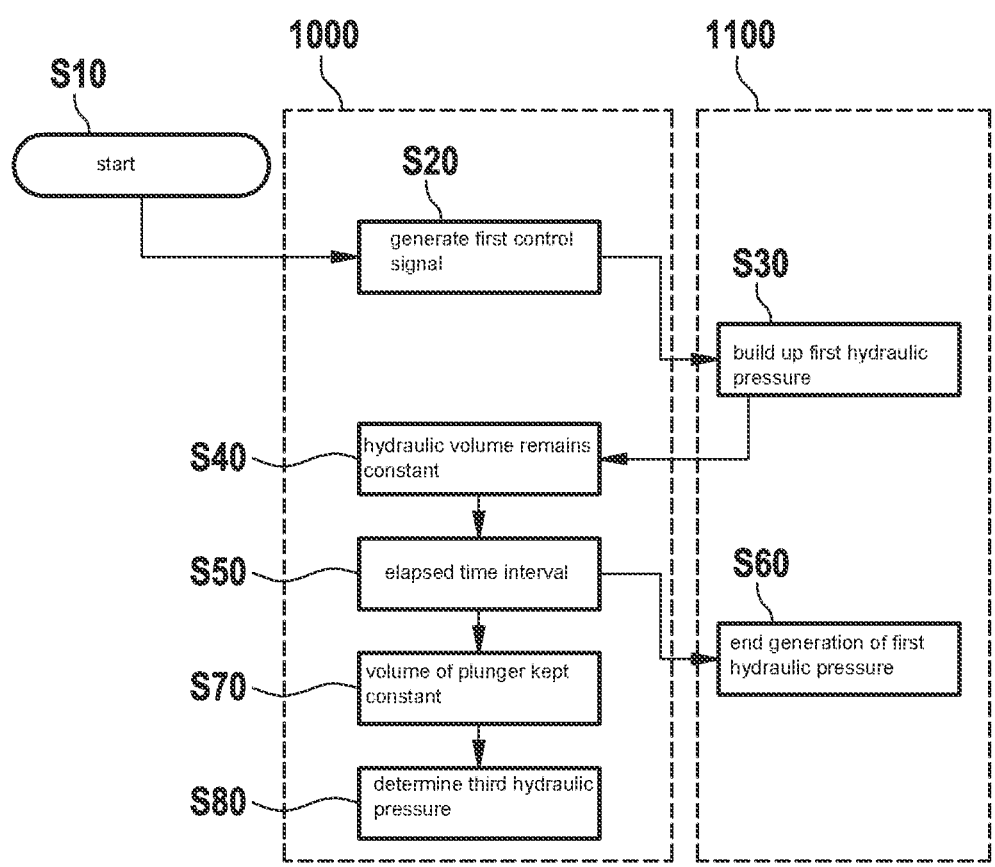
FIG. 1 shows a schematic flow chart of the method for fault detection, according to an example embodiment of the present invention.

FIG. 1 schematically outlines a flow chart of the method for fault detection in a vehicle dynamics control 1100, in a system which consists of a power brake 1000 and a vehicle dynamics control 1100 and is configured to hydraulically couple the power brake 1000 to the vehicle dynamics control 1100.

After a start of the method for fault detection S10, which can be triggered in a start sequence of a mobile platform such as a vehicle, for example, a first control signal is generated S20 and this first control signal is provided to the vehicle dynamics control 1100 in order to provide a first hydraulic pressure by means of the vehicle dynamics control, for example for brake cylinders of a vehicle brake.

When generating the first hydraulic pressure by means of the vehicle dynamics control 1100, a second hydraulic pressure at the hydraulic coupling is controlled by means of the power brake 1000 in such a way that a hydraulic volume in the system remains constant S40 while the first hydraulic pressure is being built up S30 by the vehicle dynamics control 1100. The generation of the first hydraulic pressure is ended S60 after an elapsed time interval S50, and a coupling valve SCC 1111 or 1112 is opened to determine S80 a third hydraulic pressure of the vehicle dynamics control 1100 at the hydraulic coupling using the plunger pressure sensor 1065 in order to detect a fault in the vehicle dynamics control. A volume of the plunger 1060 is kept constant S70 while opening the coupling valve SCC 1111 or 1112, i.e. a piston of the plunger 1060 maintains its position, to ensure that the third hydraulic pressure can build in front of the plunger 1060.

If the third hydraulic pressure exceeds a defined minimum value, it can be assumed that the vehicle dynamics control 1100 is currently functioning and an emergency function of the vehicle dynamics control 1100 in the event of failure of the power brake 1000 is ensured.

Figure 2:
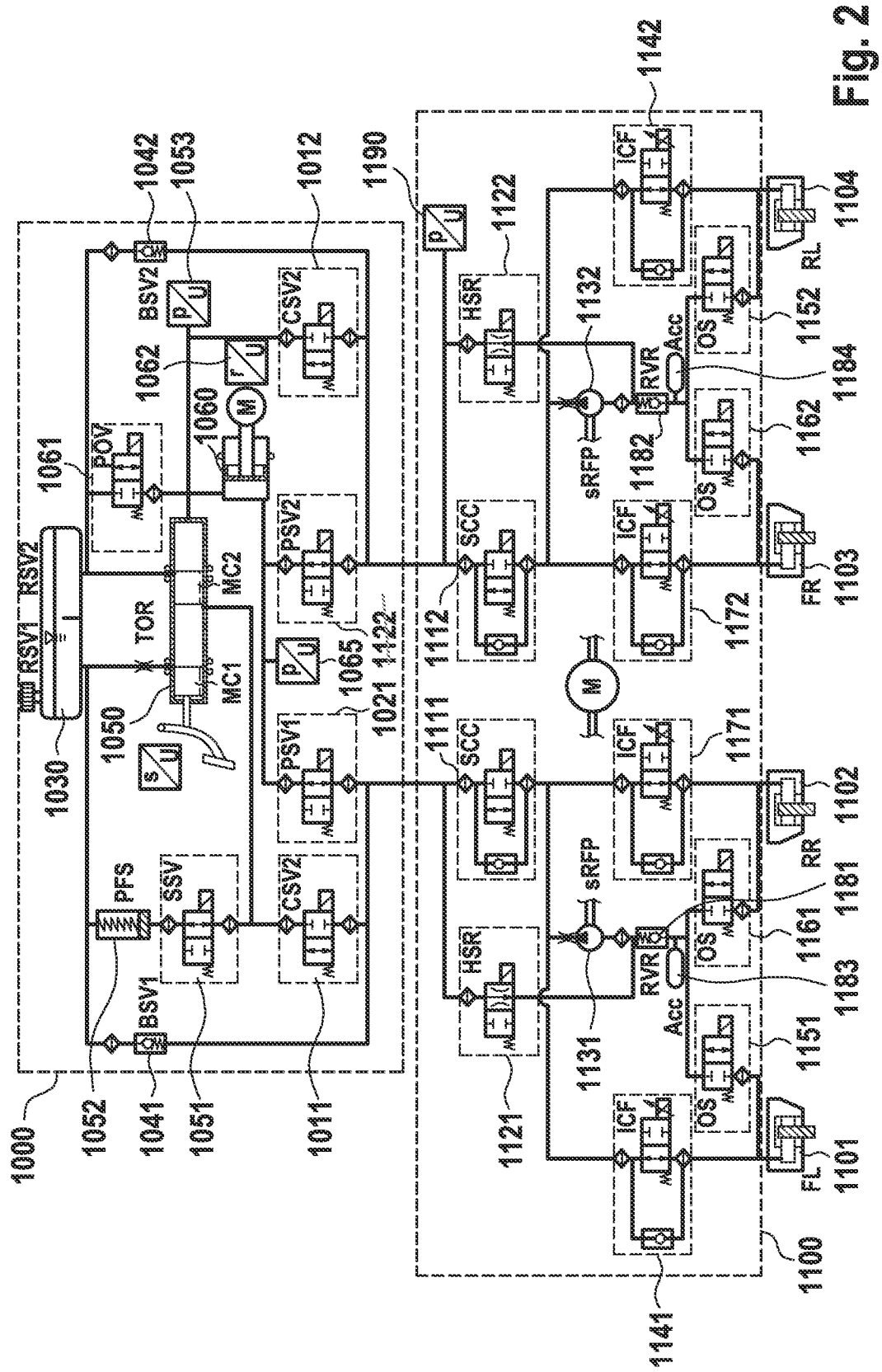
FIG. 2 shows a system consisting of a power brake and a vehicle dynamics control when pressure builds in the vehicle dynamics control.

FIG. 2 schematically outlines a system consisting of a power brake 1000 and a vehicle dynamics control 1100 with valve positions during building of the first hydraulic pressure, wherein the system is configured to hydraulically couple the power brake 1000 to the vehicle dynamics control 1100 by means of a first and second coupling valve of the power brake PSV 1,2 1021 or 1022 and a first and second coupling valve of the vehicle dynamics control SCC 1111 or 1112 and thus create a hydraulic coupling.

Both the power brake 1000 and the vehicle dynamics control 1100 have a dual circuit configuration.

A master cylinder 1050 can be manually actuated by means of a pedal that is mechanically connected to said master cylinder to act hydraulically via a first or second circuit separation valve CSV 1, 2 1011 or 1012 via respective associated circuits of the vehicle dynamics control 1100 on brake cylinders 1101, 1102, or 1103 and 1104 in order to achieve an emergency braking action. The master brake cylinder 1050 is hydraulically connected to a reservoir for hydraulic fluid 1030 by means of two snifting bores.

To build pressure during normal operation, the braking action on the brake cylinders 1101, 1102 or 1103 and 1104 can be produced by means of a plunger 1060, in that the plunger 1060 moves hydraulic volume into the two circuits of the vehicle dynamics control 1100 via the coupling valves of the power brake PSV 1, 2 1021 or 1022. The plunger 1060 can be hydraulically coupled to the hydraulic reservoir RSV 1.2 1030 via a valve POV 1061. To be able to deliver or receive hydraulic volume by means of a piston, the plunger 1060 is coupled to an electric motor. The electric motor can be regulated by means of a control system which is coupled to a sensor system for determining the electric motor position RPS 1062. The pressure of the master cylinder 1050 can be determined by means of a master cylinder pressure sensor 1053.

The dual circuit master cylinder 1050 can be hydraulically coupled to a brake simulator PFS 1052 via a valve SSV 1051 to simulate a hydraulic pressure build-up for a driver actuating the brake pedal. During normal operation, the hydraulic volume is then provided to the vehicle dynamics control 1100 by means of the plunger 1060 to achieve a braking action on the brake cylinders 1101, 1102 or 1103 and 1104 which are hydraulically coupled to the vehicle dynamics control 1100. A mechanical position of the brake pedal can be determined by means of a displacement transducer s/U, which is mechanically coupled to the brake pedal, in order to control the plunger 1060, in particular as a function of the mechanical position of the brake pedal.

A second hydraulic pressure generated by the plunger 1060 can be determined by means of a plunger pressure sensor 1065. Hydraulic fluid can be supplied to the hydraulic system consisting of the power brake 1000 and the vehicle dynamics control 1100 by means of a first check valve BSV 1,2 1041 or 1042.

The two circuits of the vehicle dynamics control 1100 are largely the same, so that describing one circuit is sufficient.

In at least one of the two circuits of the vehicle dynamics control 1100, a pressure at the hydraulic coupling can be determined by means of a pressure sensor 1190.

The power brake 1000 is hydraulically coupled to the coupling valve of the vehicle dynamics control SCC 1111 or 1112 by means of the coupling valve of the power brake PSV 1, 2 1021 or 1022 and thus forms a hydraulic coupling between the power brake 1000 and the vehicle dynamics control 1100.

The valves of the system of FIG. 2 are set to build the first dynamic pressure by means of the vehicle dynamics control 1100.

The vehicle dynamics control 1100 is configured to provide the first dynamic pressure for the vehicle dynamics control 1100 by means of the respective pump 1131 or 1132.

When a first signal to build the first dynamic pressure is provided to the vehicle dynamics control 1100, for example at the start of the method for fault detection, for example by a control system of the power brake 1000, the vehicle dynamics control 1100 starts generating the first dynamic pressure in the vehicle dynamics control 1100.

The necessary hydraulic volume is provided to the vehicle dynamics control 1100 at the hydraulic coupling by the power brake 1000.

To provide the hydraulic volume at the hydraulic coupling, a second hydraulic pressure is generated by the power brake 1000 by means of the plunger 1060, controlled by means of the plunger pressure sensor 1065 and provided to the hydraulic coupling at the hydraulic coupling of the vehicle dynamics control 1100 by the power brake 1000, so that the vehicle dynamics control 1100 can build the first hydraulic pressure using the provided hydraulic volume.

For this purpose, the respective coupling valve of the vehicle dynamics control SCC 1111 or 1112 is closed and the high-pressure valve HSR 1121 or 1122 is opened to hydraulically couple the respective pump of the vehicle dynamics control 1131 or 1132 to the hydraulic coupling. The second hydraulic pressure generated by the plunger 1060 serves to ensure that the required hydraulic volume is not taken from the reservoir 1030, but is provided by the plunger 1060 to build pressure for the first dynamic pressure by means of the vehicle dynamics control 1100, because the second dynamic pressure prevents the opening of the respective check valves BSV 1,2 1041 or 1042.

The thus generated first hydraulic pressure of the vehicle dynamics control 1100 is provided to the brake cylinders 1101, 1102 or 1103, 1104 via the respective open valves ICF 1141 1171 or 1142, 1172 in order to achieve a braking action.

Figure 3:
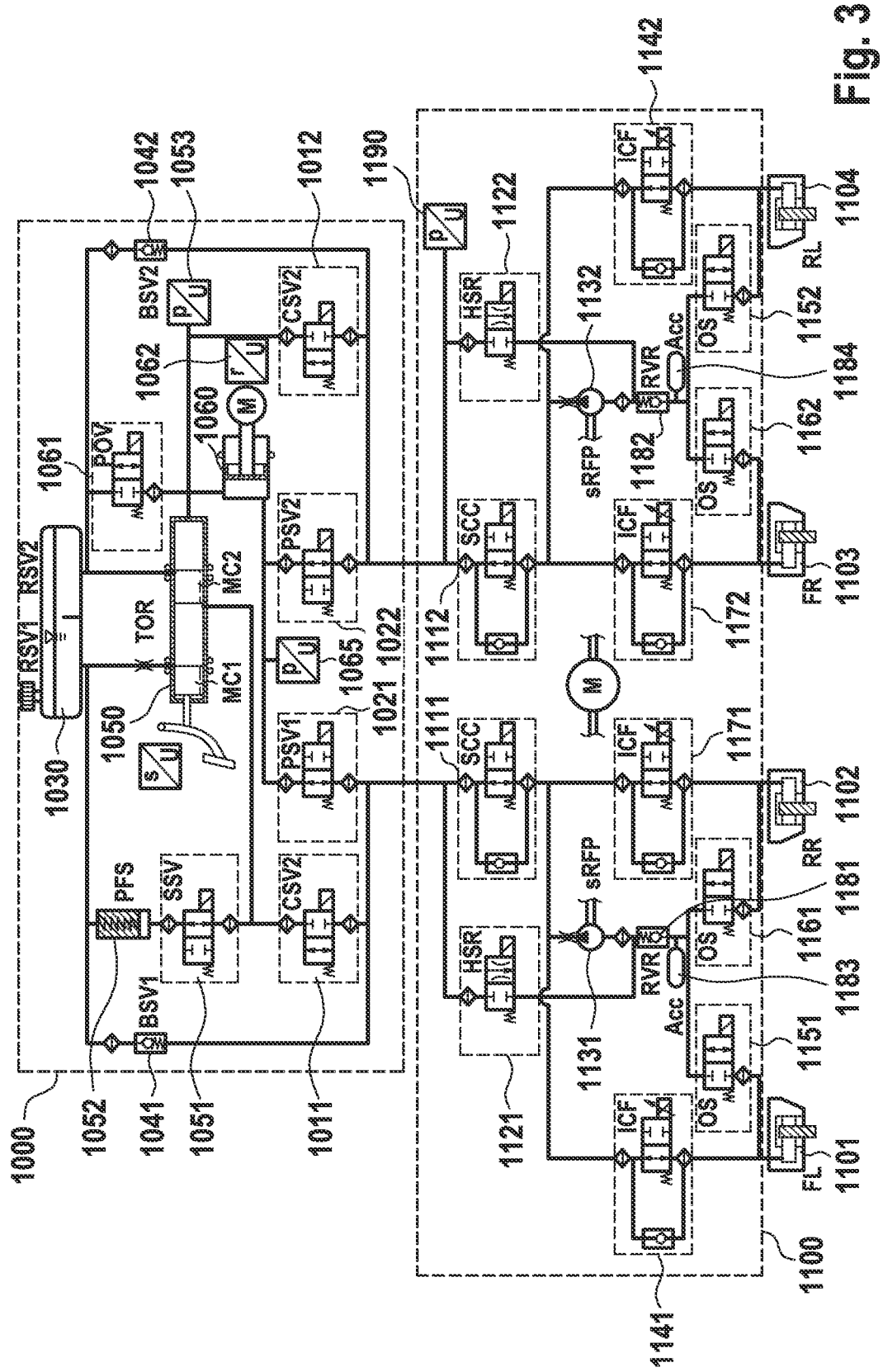
FIG. 3 shows a system consisting of a power brake and a vehicle dynamics control during evaluation of a resulting pressure.

FIG. 3 schematically outlines a valve position of the system consisting of the power brake 1000 and the vehicle dynamics control 1100 for determining the third hydraulic pressure. For this purpose, the high-pressure valve HSR 1121 or 1122 of the vehicle dynamics control is closed and the respective coupling valve of the vehicle dynamics control SCC 1111 or 1112 is opened, so that the third hydraulic pressure at the plunger pressure sensor 1065 can be determined by means of the open coupling valve of the power brake PSV 1,2 1021 or 1022. The volume of the plunger 1060 is kept constant by fixing the position of the piston of the plunger, so that the third hydraulic pressure can build.

If this third hydraulic pressure is greater than a predetermined value, it can be assumed that the vehicle dynamics control 1100 is intact and can then provide emergency functions.

Figure 4:
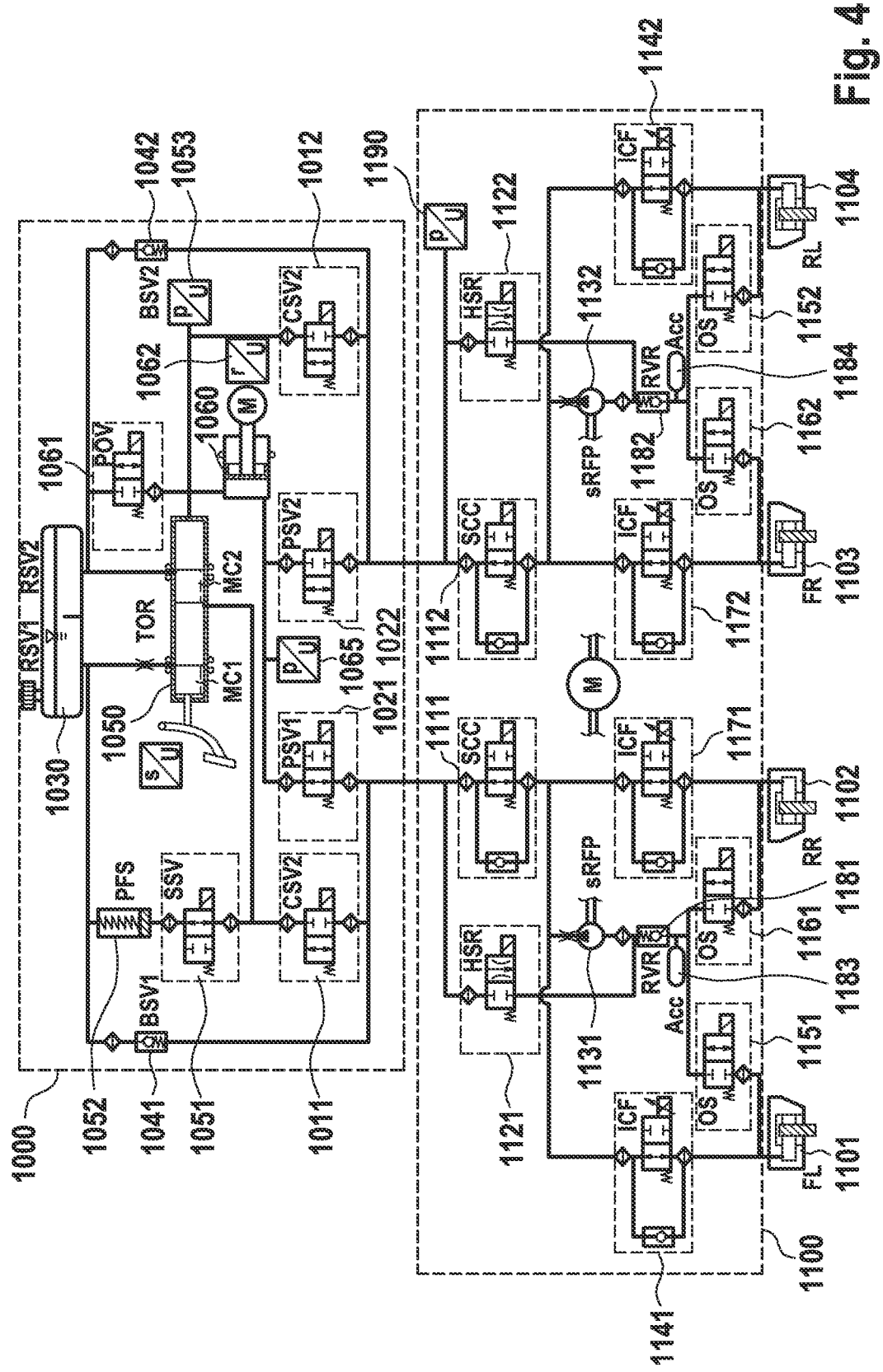
FIG. 4 shows a system including a power brake and a vehicle dynamics control during evaluation of a first circuit of the vehicle dynamics control.

FIG. 4 describes a valve position of the system consisting of the power brake 1000 and the vehicle dynamics control 1100 for detecting a functionality of only one of the two circuits of the vehicle dynamics control 1100; by keeping the coupling valve of the power brake PSV 2 1022 closed after the third hydraulic pressure has built up, the respective other circuit with the open coupling valve of the power brake PSV 1 1021 can be detected only to detect a fault in this circuit that is hydraulically connected to the plunger pressure sensor 1065.

Figure 5:
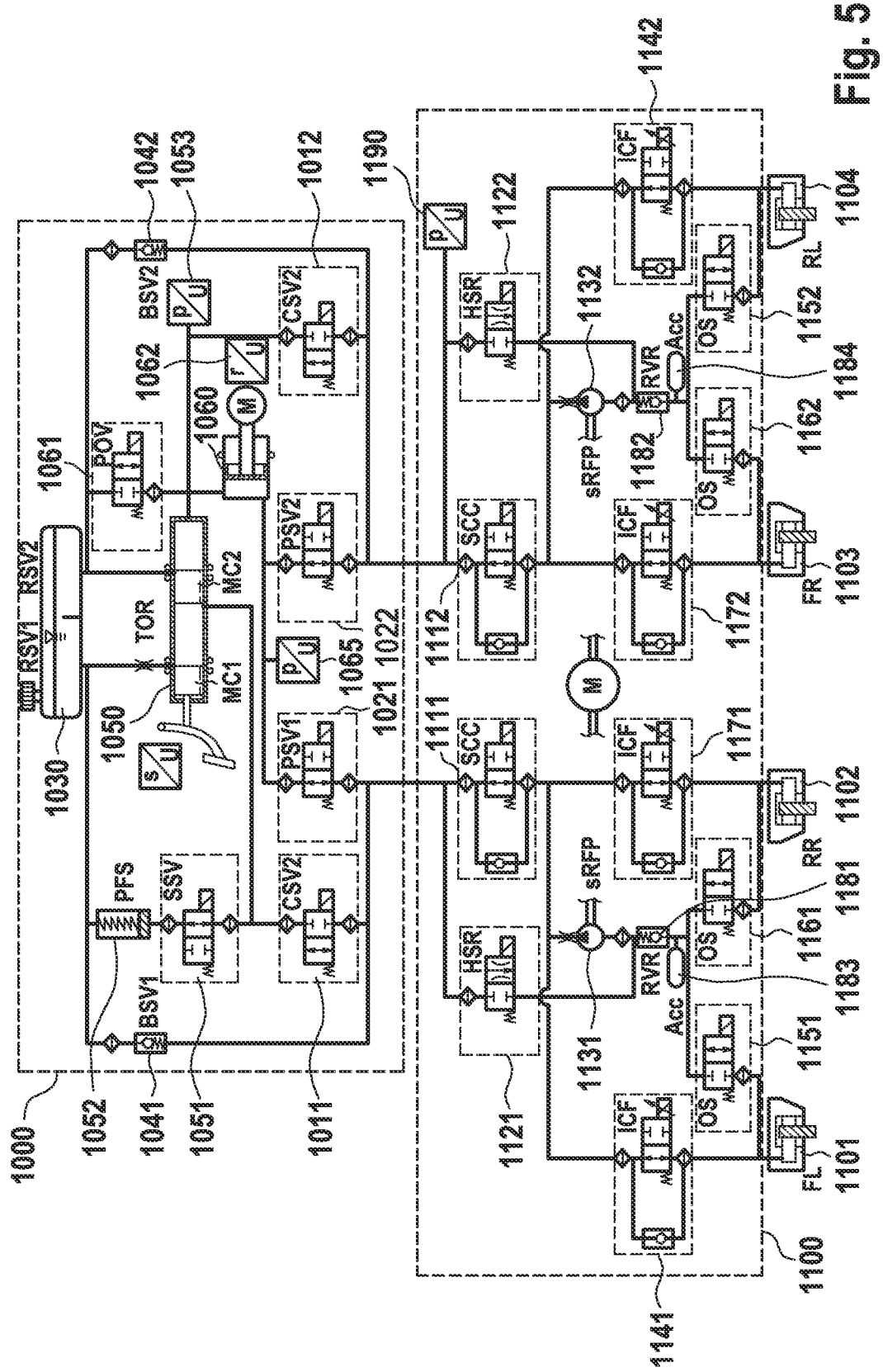
FIG. 5 shows a system including a power brake and a vehicle dynamics control during evaluation of a second circuit of the vehicle dynamics control.

FIG. 5 describes a valve position of the system consisting of the power brake 1000 and the vehicle dynamics control 1100 for detecting a functionality of the second circuit that was not detected in the method according to the description of FIG. 4. For this purpose, the coupling valve of the power brake PSV 2 1022 is opened according to the method as described in FIG. 4.

If the third hydraulic pressure determined by means of the plunger pressure sensor 1065 continues to determine a pressure greater than a predetermined value, it can be assumed that the second circuit of the vehicle dynamics control 1100 is functional as well, because, if there was a defect in the second circuit, the third pressure built by the first circuit would drop.

Figure 6:
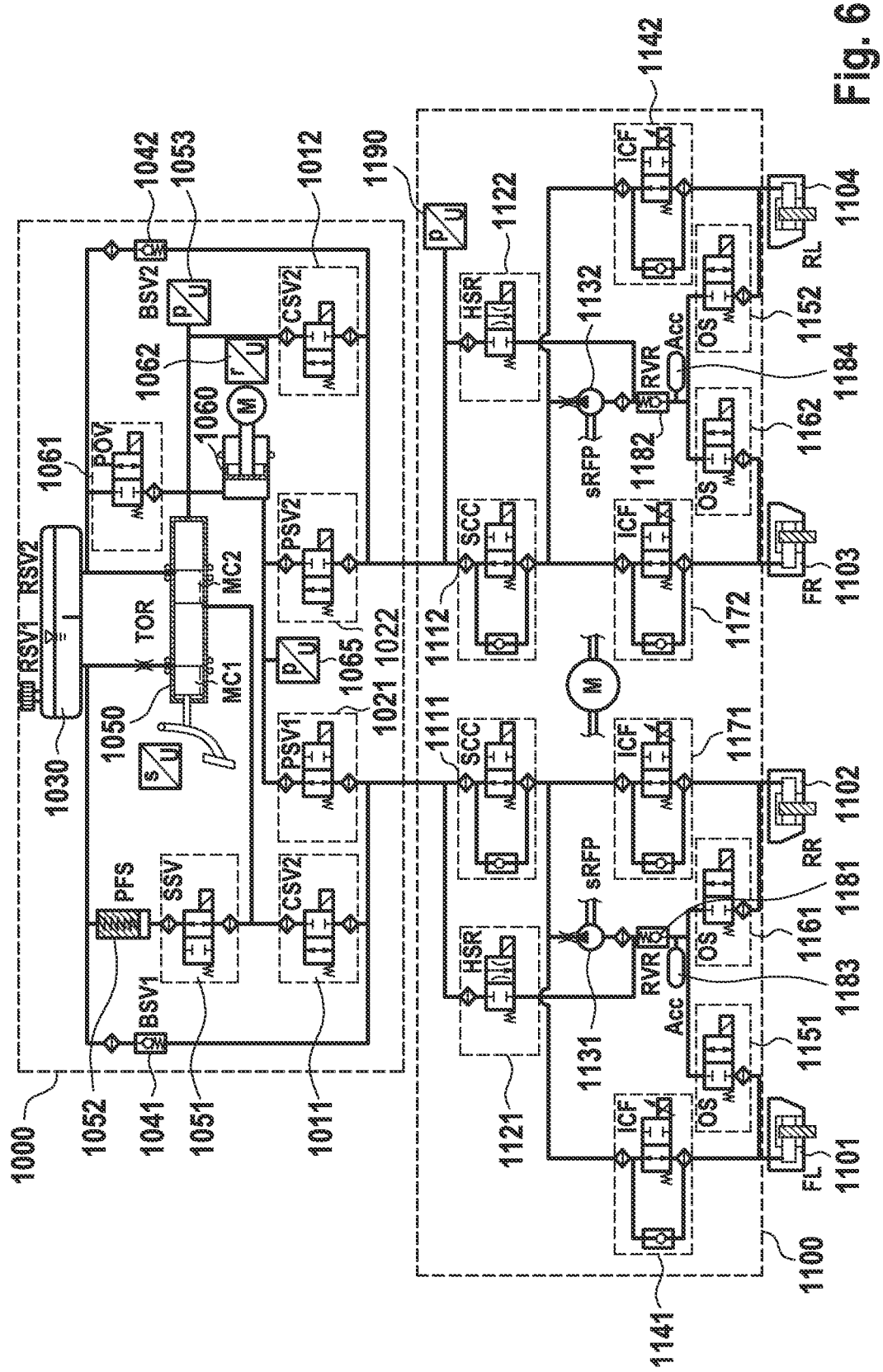
FIG. 6 shows a system including a power brake and a vehicle dynamics control during an alternative evaluation of the second circuit of the vehicle dynamics control.

FIG. 6 describes an alternative valve position of the system consisting of the power brake 1000 and the vehicle dynamics control 1100 for detecting a functionality of the second circuit, in which, after the pressure build-up and fault detection in the first circuit as explained with reference to FIG. 4, the third hydraulic pressure in the second circuit is determined by means of the coupling pressure sensor 1165, which is hydraulically disposed such that it can determine the pressure at the hydraulic coupling of the second circuit of the vehicle dynamics control 1100. If the value determined with the coupling pressure sensor 1165 is greater than a predetermined value, it can be assumed here too that the second circuit of the vehicle dynamics control 1100 is functioning, or a fault can be detected if the value determined with the coupling pressure sensor 1165 is less than the predetermined value.

In other words, by separately opening the coupling valves of the vehicle dynamics control SCC 1111 or 1112 or by closing a coupling valve of the power brake PSV 1,2 1021 or 1022, the fault detection can also be carried out on a circuit-by-circuit basis. For this purpose, one circuit is connected to the plunger pressure sensor 1065 first and the coupling valves in the second circuit are switched in such a way that the connection to the pressure sensor is not open. The pressure in the first circuit can now be evaluated. There are two different options for the evaluation in the second circuit. In the next step, either the second circuit can be connected to the plunger pressure sensor 1065 as well and the third hydraulic pressure generated by the vehicle dynamics control 1100 in the second circuit can thus be evaluated, or the third hydraulic pressure in the second circuit is evaluated by the coupling pressure sensor 1190 with no connection to the plunger pressure sensor 1065.

The test is then ended by controlling the power brake 1000 back to a passive state or an idle state.

A pressure in the brake cylinders 1101, 1102 or 1103 and 1104 can be absorbed from the brake cylinders by the vehicle dynamics control 1100, in particular via the accumulators 1183 and 1184 via the check valve 1181, 1182, by means of the outlet valves 1151, 1161 or 1152, 1162, and/or pumped back into the high pressure circuit of the vehicle dynamics control 1100 via the high-pressure pump 1131 or 1132.

The invention claimed is:

1. A method for fault detection in a vehicle dynamics control, in a system which includes a power brake and a vehicle dynamics control and is configured to hydraulically couple the power brake to the vehicle dynamics control, the method comprising the following steps:
generating a first control signal and providing the first control signal to the vehicle dynamics control to provide a first hydraulic pressure using the vehicle dynamics control;
generating the first hydraulic pressure using the vehicle dynamics control, wherein a second hydraulic pressure at the hydraulic coupling is controlled using the power brake in such a way that a hydraulic volume in the system remains constant; and
after the generating of the first hydraulic pressure has ended, determining a third hydraulic pressure of the vehicle dynamics control at the hydraulic coupling to detect a fault in the vehicle dynamics control.

2. The method according to claim 1, wherein the hydraulic volume of the system is kept constant using a plunger of the power brake.

3. The method according to claim 2, wherein the hydraulic volume of the system is kept constant by mechanically moving a position of a piston of the plunger of the power brake out of an initial position.

4. The method according to claim 1, wherein the generation of the first hydraulic pressure is ended after an elapsed time interval.

5. The method according to claim 4, wherein a valve is opened after the elapsed time interval to hydraulically couple the power brake and the vehicle dynamics control to one another using the valve.

6. The method according to claim 5, wherein the valve is a controllable valve of the vehicle dynamics control.

7. The method according to claim 1, wherein the first hydraulic pressure and/or the second hydraulic pressure and/or the third hydraulic pressure is determined using a pressure sensor of the power brake at the hydraulic coupling.

8. The method according to claim 1, wherein the first control signal is provided by a control unit of the power brake.

9. The method according to claim 1, wherein the first control signal is a binary signal and/or an analog signal.

10. The method according to claim 1, wherein the method is carried out prior to a start of a mobile platform.

11. The method according to claim 10, wherein a parking brake of the mobile platform is closed prior to a first step of the method.

12. A system for fault detection in a vehicle dynamics control, comprising:
a power brake;
a vehicle dynamics control, wherein the system is configured to hydraulically couple the power brake to the vehicle dynamics control;
a control unit for the power brake;
wherein the power brake is signal-coupled to the vehicle dynamics control; and
wherein the system is configured to detect a fault in the vehicle dynamics control, the system configured to:

generate a first control signal and providing the first control signal to the vehicle dynamics control to provide a first hydraulic pressure using the vehicle dynamics control;

generate the first hydraulic pressure using the vehicle dynamics control, wherein a second hydraulic pressure at the hydraulic coupling is controlled using the power brake in such a way that a hydraulic volume in the system remains constant; and after the generating of the first hydraulic pressure has ended, determine a third hydraulic pressure of the vehicle dynamics control at the hydraulic coupling to detect the fault in the vehicle dynamics control.

13. The system according to claim 12, wherein the system is configured for braking at least one wheel of a mobile platform.

* * * * *